April 19, 1932.    R. A. WALTER    1,854,283
LOADING ATTACHMENT FOR RECIPROCATING CONVEYERS
Filed June 22, 1926    2 Sheets-Sheet 1
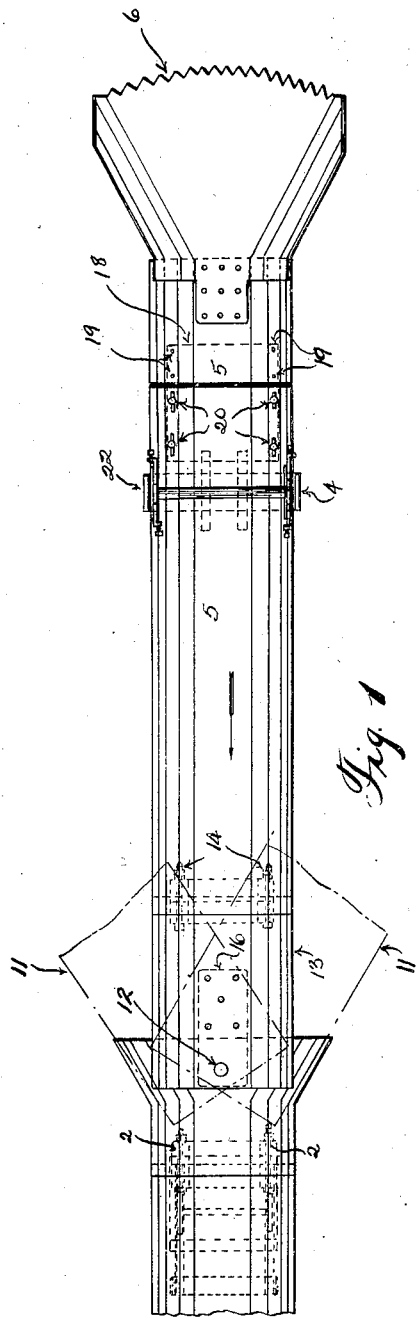
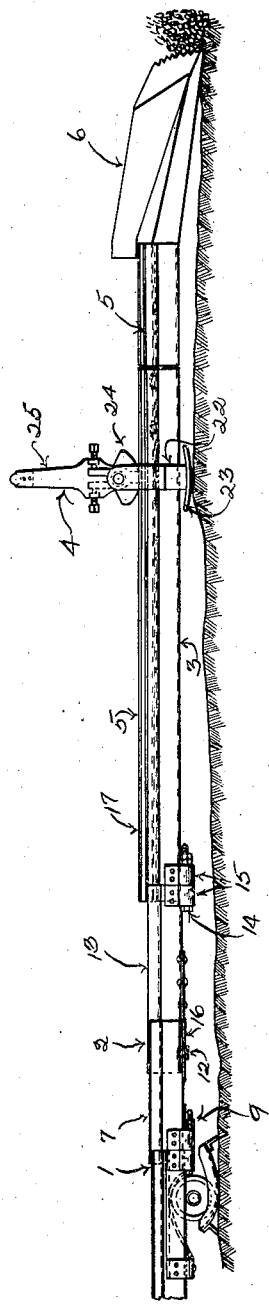
INVENTOR
RAYMOND A. WALTER
BY
ATTORNEY April 19, 1932. R. A. WALTER 1,854,283
LOADING ATTACHMENT FOR RECIPROCATING CONVEYERS
Filed June 22, 1926  2 Sheets-Sheet 2

INVENTOR
RAYMOND A. WALTER
BY
ATTORNEYS

Patented Apr. 19, 1932

1,854,283

UNITED STATES PATENT OFFICE

RAYMOND A. WALTER, OF NEW YORK, N. Y., ASSIGNOR, BY MESNE ASSIGNMENTS, TO GOODMAN MANUFACTURING COMPANY, OF CHICAGO, ILLINOIS, A CORPORATION OF ILLINOIS

LOADING ATTACHMENT FOR RECIPROCATING CONVEYERS

Application filed June 22, 1926. Serial No. 117,626.

This invention relates in general to a loading attachment for a conveyer and more particularly to a loading attachment adapted to operate in conjunction with a reciprocating conveyer.

Heretofore in the art the methods of loading material on reciprocating conveyers having especial reference to mineral products of a granular or blocky nature have been of a manual sort necessitating undue expenditure for superfluous labor. Such methods have further proved generally inefficient and unsatisfactory for numerous other reasons for in many instances the cavity from which the material is obtained is of such a nature that it is impractical for a number of laborers or even one to work under proper conditions.

It is an object of this invention to provide an attachment for a reciprocating conveyer that will supplant manual loading and materially facilitate the handling of mineral products.

Another object of this invention is to provide a loading attachment for a reciprocating conveyer adapted to operate in conjunction with the conveyer mechanism.

Still another object of this invention is to provide a loading attachment for a reciprocating conveyer provided with a mechanism adapted to feed the loader mechanically into the material adapted to be conveyed.

A further object of this invention is to provide a loading attachment for a reciprocating conveyer adapted to operate in a minimum amount of space.

This invention consists in general of a fixed section of conveyer trough having one end fixed to a reciprocating conveyer, the other end being provided with a flared portion, allowing lateral movement, to which there is adapted to be connected, by a hinged bolt, the main body of the loading attachment comprising a bottom swinging flanged conveyer trough engaging an inner extensible flanged trough, and having a reinforcing strip between the flanges. A shoveling head is secured to the end of the inner extensible trough, and bolted to the bottom trough is a feeding mechanism comprising a frame having mounted thereon a plurality of adjustable eccentric clamps engaging the flanges of the inner trough and adapted to be operated by levers having a unitary handle.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings forming a part of this specification:

Figure 1 is a top plan view of the loading device forming the subject matter of this invention;

Fig. 2 is a side elevation plan view of the loading attachment showing the shoveling head in perspective;

Figure 3:
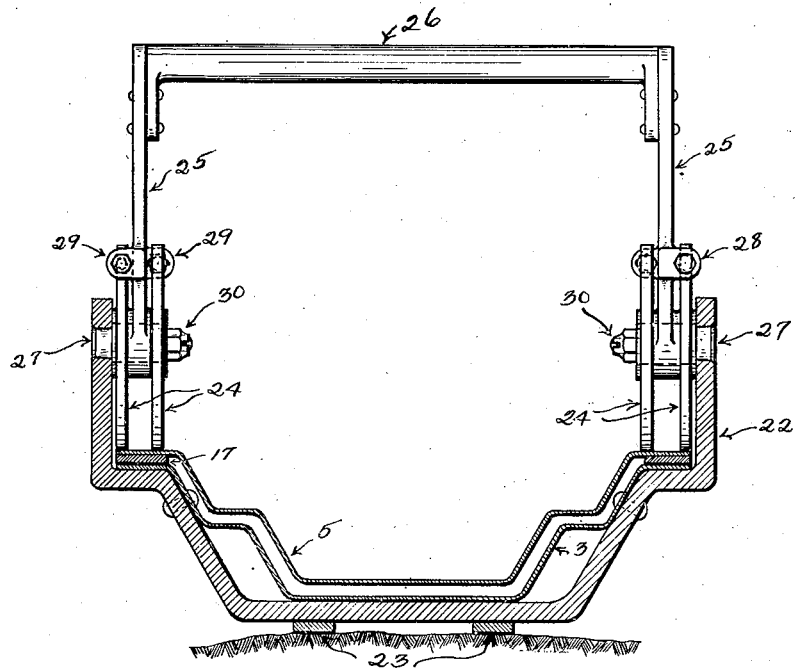
Fig. 3 is a front elevation sectional view of the feeding device shown in engagement with the main body of the loading attachment.
Figure 4:
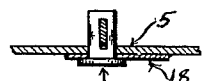
Fig. 4 is a front elevation sectional view showing the connector element for supplementary inner trough units.
Figure 5:
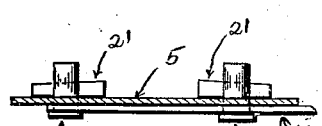
Fig. 5 is a side elevation sectional view showing the connector elements for the inner extensible trough.
Figure 6:
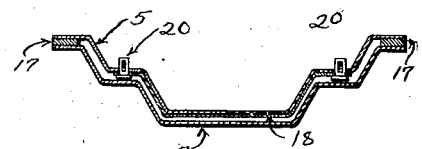
Fig. 6 is a front elevation sectional view showing the method of connecting supplementary inner trough units.
Figure 7:
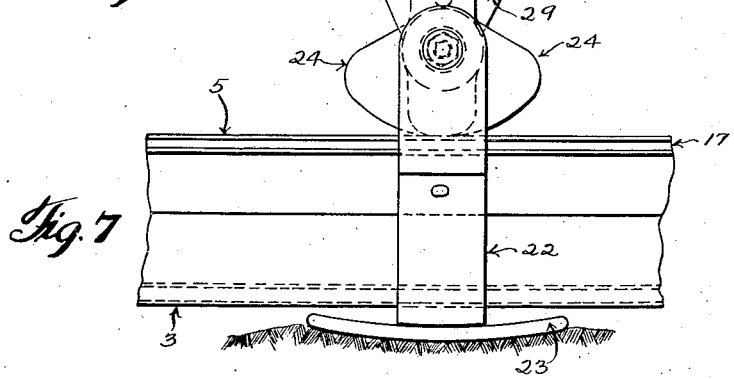
Fig. 7 is a side elevation plan view of the feeding mechanism.

Referring by numerals to the drawings, in Figures 1 and 2, the rear end of a reciprocating conveyer is designated by the numeral 1 to which there is adapted to be secured, so as to reciprocate in conjunction therewith, a loading attachment comprising a hinged swiveling device 2 permitting lateral movement and a bottom swinging conveyer trough 13, an extending mechanism 4, better shown in Figures 3 and 7, and an inner extensible trough 5 having secured thereto a shoveling head 6, adapted to engage the material to be conveyed.

The swiveling device 2 comprises a fixed section of conveyer trough 7 connected by fastenings 8 to the end of the conveyer 1 by bolts 9. The trough 8 is flared at the end 10 to permit lateral movement of the loading attachment as shown by the dotted lines 11. One end of a short trough section 13 is pivoted on the end of the flared section 7 by a bolt 12 and the other end fixed to the end of the bottom swinging trough 3 and held by bolts 14 positioned in ears formed on straps attached to the adjacent ends of the troughs 13 and 3. A reinforcing plate 16 is riveted to the bottom of the short section 13 adapted to strengthen the pivotal joint between the flared section 7 and the section 13. It is manifest that the sections 7 and 13 may be fixed in the conveyer at the point shown or interposed between two conveyer sections if lateral movement is desired from a point further back.

The main body of the loading attachment comprises a bottom swinging trough 3 and an upper or inner extensible trough 5 movable longitudinally with respect to the bottom swinging trough, reinforced at the flanges by strip 17 and made up in sections nested within the trough 3. The inner trough may be extended by adding additional sections which sections are designed to be connected by a plate 18 by rivets 19 an connected to the adjacent section by flat headed slot pins 20 locked by wedges 21.

A shoveling head 6 is secured by rivets or any other suitable means to the end inner trough section 5 and having a head preferably circular and serrated, it having been found that a flat head with or without a serrated edge will not function in a satisfactory manner in that there is a tendency to work upward rather than under the material to be shoveled. I have found that when the edge is formed as the arc of a circle with either a smooth or serrated edge dependent on the material to be handled, the results are very satisfactory. Although this type of design has been found to be most efficient it is manifest that any desired form which operates to force the shovel head under the pile may be used.

An extending adjustment 4 illustrated in greater detail in Figures 3 and 7 is secured to the bottom trough 3 comprising a framework 22 mounted on skids 23. Mounted on the framework 22 are adjustable eccentric clamps 24 operated by levers 25 having a unitary handle 26. The adjustable eccentric clamps 24 are hinged on pins 27 and are adjusted by adjusting screws 28 adapted to rotate in lugs 29. The levers 25 also hinge on pins 27 and together with the clamps 24 are held in place by nuts 30.

The operation of this loading attachment may be readily understood having reference to Figures 1 and 3. The handle 26 is adapted to be pushed forward toward the shoveling head 6 thus tilting the levers 25 until the clamp 24 compresses the flange 5 against the reinforcement strip 17, which in turn will engage the flange of the trough 3, thereby firmly holding them together and preventing any slipping movement. The conveyer 1 is then set in motion causing the entire loading attachment to reciprocate, this attachment being supported for reciprocating motion by members having contact with the floor or ground surface and by the shoveling head 6. If it is desired to extend or retract the shoveling head 6 the operator first permits his hand to travel back and forth with the lever 25 until the rhythm of the conveyer stroke has been acquired. When it is desired to advance the shoveling head into the material to be loaded the motion of the conveyer is anticipated, and the lever 25 moved away from the material slightly in advance of the same motion of the conveyer. This action causes the release of the clamps 24 and thereby permits the bottom trough 3 to slide out from under the trough 5 leaving the trough 5 and the shoveling head 6 extended. On the next stroke toward the material the operator pushes the handle forward causing the clamps 24 to again compress and so permit the shoveling head clamped on the bottom trough to be pushed further into the material, this action may be repeated until the desired extension is reached.

Having obtained the desired depth of insertion the operator merely holds the handle forward thus keeping the troughs clamped together and thus by the normal action of the conveyer, the material is carried away. The shoveling head 6 is withdrawn by reversing the operation previously described, that is, tilting the handle 25 backward on the stroke toward the material, thus causing the clamps to loosen and tightening them on the withdrawing stroke. In the event that it is desired to extend the shoveling head 6 by advancing a greater distance than the length of a section of trough 5 allows, this may be done by inserting an additional section or sections secured by means of the splice plates 18.

If the shoveling head meets with an obstacle during the operation of the conveyer, the trough 5 is adapted to slide back within the trough 3 against the pressure exerted by the clamps and thus prevent damage to the loading device or to the conveyer.

There is accomplished by this invention a loading attachment for a reciprocating conveyer operating in conjunction therewith adapted to supplant manual loading and so constructed as to provide means for extending the loader to any degree necessary by cooperation with the conveyer mechanism and operating in a minimum of space.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A reciprocating loading attachment for a reciprocating conveyer, operable by the conveyer and adjustably extensible or retractable with respect thereto by relative movement therebetween during operation.

2. A loading attachment for a reciprocating conveyer, comprising a trough, and means forming a part of the conveyer fixed to the trough, longitudinally adjustable in either direction with respect thereto to extend or retract the conveyer during operation.

3. A loading attachment for a reciprocating conveyer comprising a pivoted trough section, and means detachably connected to the trough, and movable with respect thereto, to load material.

4. A loading attachment for a reciprocating conveyer comprising a flared trough section, a trough section pivoted to the flared trough section, and means associated with the pivoted trough to load material.

5. A loading attachment for a reciprocating conveyer, comprising a trough, means to change the position of the trough in either direction longitudinally with respect to the conveyer during operation, and means fixed to the trough to load material.

6. A loading attachment for a reciprocating conveyer, comprising an unattached trough, movable with respect to the conveyer, nested in the end of the conveyer, and capable of longitudinal movement in either direction with respect thereto during operation, and means fixed to the trough to load material.

7. A loading attachment for a reciprocating conveyer, comprising a sectional trough allowing lateral movement, and unattached means secured to the trough, capable of longitudinal movement in either direction with respect to the conveyer during operation, to load material.

8. A loading attachment for a reciprocating conveyer, comprising a flanged bottom swinging trough, a flanged inner sectional extensible trough adapted to reciprocate in conjunction with the conveyer, a reinforcing strap between said flanges, and means secured to the inner trough to load material.

9. In a loading attachment for a reciprocating conveyer, embodying a reciprocating extensible trough, means to extend the trough while in motion, comprising a feeding mechanism carried on the conveyer independent of external support.

10. In a loading attachment embodying an extensible trough, a feeding mechanism comprising a frame and eccentric clamps provided with levers mounted on the frame, the eccentric clamps being adapted to engage the trough.

11. In a loading attachment embodying an extensible flanged trough, a feeding mechanism comprising a frame provided with bottom skids and adjustable eccentric clamps provided with operating levers mounted on the frame, the eccentric clamps being adapted to engage the flanges of the trough.

12. In combination with a reciprocating conveyer, a loading attachment comprising a trough secured to said conveyer, and means fixed to the trough movable longitudinally in either direction with respect to the conveyer during operation to load material.

13. In combination with a reciprocating conveyer, a loading attachment comprising a stationary flared trough and means adapted to reciprocate in conjunction with the conveyer, fixed to the trough by a hinge bolt allowing lateral movement, to load material.

14. In combination with a reciprocating conveyer, a loading attachment comprising a flanged bottom swinging trough, a flanged inner sectional extensible trough, adapted to reciprocate in conjunction with the conveyer, a reinforcement strip between said flanges and means secured to the inner trough to load material.

15. In combination with a reciprocating conveyer, a loading attachment comprising an extensible flanged trough, a feeding mechanism having a frame provided with bottom skids, and eccentric clamps mounted on the frame having operating levers adapted to engage the flanges of the trough.

16. A reciprocating conveyer comprising a loading attachment having a shovel in frictional engagement with the conveyer, and means to allow slippage of the shovel if an obstacle is encountered in loading.

17. A method of extending or retracting a reciprocating conveyer, comprising clamping a supplementary trough within a conveyer trough, releasing the clamp pressure on the back stroke of the conveyer to extend the supplementary trough restoring the clamp pressure on the trough, and releasing the clamp pressure of the forward stroke of the conveyer to retract the supplementary trough.

18. A loading attachment for a reciprocating conveyer comprising a bottom trough, an inner unattached trough adapted to reciprocate in conjunction therewith, having means provided on the end for loading material, the inner trough being capable of longitudinal movement in both a forward and rearward direction with respect to the bottom trough of the conveyer during operation to extend or retract the loading means.

19. A loading attachment for a reciprocating conveyer comprising a bottom trough capable of movement about a pivot in a longitudinal plane, an inner unattached trough in the bottom trough adapted to reciprocate in conjunction therewith, means to allow relative movement between the bottom and inner troughs during operation to extend or retract the conveyer and means fixed to the end of the inner trough for loading material.

20. A method of extending or retracting at will a reciprocating conveyer, comprising nesting a movable trough within a conveyer trough, holding them in fixed relation by frictional engagement, and releasing the frictional engagement on the backward or the forward stroke of the conveyer to extend or to retract the nested trough.

21. A method of extending or retracting a reciprocating conveyer comprising clamping a supplementary trough to a conveyer trough and releasing the clamp pressure on the supplementary trough on the backward or forward stroke of the conveyer to extend or retract the supplementary trough.

22. A method of extending or retracting a reciprocating conveyer comprising clamping a supplementary trough in a conveyer trough and releasing the clamping pressure on the backward or forward stroke of the conveyer so that the conveyer trough may retract or extend with respect to the supplementary trough by reason of its inertia so as to extend or retract the conveyer by clamping the supplementary trough thereto when the conveyer has been retracted or extended with respect thereto.

23. A loading attachment comprising a reciprocating conveyer trough, a supplementary trough normally carried in frictional engagement therewith and means to vary the length of the conveyer trough by releasing the frictional engagement with the supplementary trough whereby the conveyer trough may be retracted or extended with respect to the supplementary trough and frictionally re-engaged therewith to extend or retract the conveyer trough.

24. A method of changing the length of a reciprocating conveyer comprising binding a supplemental unattached trough in a conveyer trough and releasing the supplemental trough so that the same by reason of its inertia will remain stationary with respect to the reciprocating conveyer, and rebinding the supplemental trough to the conveyer trough in a different relative relation to extend or retract the conveyer.

25. A loading attachment for a reciprocating conveyer comprising a reciprocating conveyer trough and a supplemental trough securable therein, adapted to be released so that the same by reason of its inertia is allowed to remain stationary with respect to the reciprocating conveyer and be resecured in a different relative relation to extend or retract the conveyer.

26. The combination with a longitudinally extended articulated reciprocatory conveyer of a feeder therefor, secured thereto and adapted to reciprocate in unison therewith comprising a longitudinally extensible pick-up member in communication with the end of the conveyer.

27. The combination with a longitudinally extended articulated reciprocatory conveyer of a feeder therefor, comprising a longitudinally extensible pick-up member in communication with the end of the conveyer, comprising a trough secured to the conveyer and a second trough longitudinally movable in relation to the first trough.

28. A conveyer feeding member comprising a plurality of nested troughs, means for imparting to said troughs a conveying reciprocation, means for extending the terminal or upper trough member in relation to the trough member adjacent thereto, the terminal member being provided at its end with a laterally widened digging member.

29. A conveyer feeding member comprising a plurality of nested troughs, means for imparting to said troughs a conveying reciprocation, means for extending the terminal or upper trough member in relation to the trough member adjacent thereto, the terminal member being provided at its end with a laterally widened digging member, and means for holding said nested trough members against relative longitudinal movement in relation to each other.

In testimony whereof I affix my signature.

RAYMOND A. WALTER.